(12) United States Patent
Agarwal et al.

(10) Patent No.: US 6,389,416 B1
(45) Date of Patent: May 14, 2002

(54) DEPTH FIRST METHOD FOR GENERATING ITEMSETS

(75) Inventors: Ramesh C. Agarwal; Charu C. Aggarwal, both of Yorktown Heights, NY (US); V. V. V. Prasad, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,243

(22) Filed: Feb. 19, 1999

(51) Int. Cl.$^7$ .............................................. G06F 17/30
(52) U.S. Cl. ...................... 707/6; 707/3; 707/4; 707/5; 706/18; 706/48
(58) Field of Search ............................... 707/2, 3, 4, 5, 707/6, 201; 706/18, 48

(56) References Cited

U.S. PATENT DOCUMENTS

| | | | | |
|---|---|---|---|---|
| 5,615,341 A | * | 3/1997 | Agrawal et al. | 705/10 |
| 5,724,573 A | * | 3/1998 | Agrawal et al. | 707/6 |
| 5,842,200 A | * | 11/1998 | Agrawal et al. | 707/1 |
| 5,920,855 A | * | 7/1999 | Aggarwal et al. | 707/3 |
| 6,061,682 A | * | 5/2000 | Agrawal et al. | 707/6 |
| 6,138,117 A | * | 10/2000 | Bayardo | 707/6 |
| 6,185,559 B1 | * | 2/2001 | Brin et al. | 707/6 |
| 6,272,478 B1 | * | 8/2001 | Obata et al. | 706/12 |
| 6,278,997 B1 | * | 8/2001 | Agrawal et al. | 707/6 |
| 6,278,998 B1 | * | 8/2001 | Ozden et al. | 707/6 |
| 6,301,575 B1 | * | 10/2001 | Chadha et al. | 707/2 |
| 6,311,179 B1 | * | 10/2001 | Agarwal et al. | 707/3 |
| 6,324,533 B1 | * | 11/2001 | Agrawal et al. | 707/3 |

OTHER PUBLICATIONS

Agrawal et al. "Mining Associatin Rules between Sets of Items in Large Databases", IBM Almaden Research Center, San Jose, CA May 1993, pp 207–216.*

Yen et al. "An Efficient Data Mining Technique for Discovering Interesting Association Rules", Database and Expert System Applications, 1997. pp: 664–669.*

Cheung et al. "A Fast Distributed Algorithm for Mining Association Rules", Parallel and Distributed Information System, 1996 pp. 31–42.*

Bayardo R "Efficiently mining long patterns from databases" ACM SIGMOD Record, Jun. 1998, pp. 85–93.*

* cited by examiner

*Primary Examiner*—John Breene
*Assistant Examiner*—Khanh Pham
(74) *Attorney, Agent, or Firm*—Scully, Scott, Murphy & Presser; Gail H. Zarick, Esq.

(57) ABSTRACT

A system and method for generating itemset associations in a memory storage system comprising many transactions, with each transaction including one or more items capable of forming the itemset associations. The method involves generating a lexicographic tree structure having nodes representing itemset associations meeting a minimum support criteria. In a recursive manner, for each lexicographic least itemset (node) P of the lexicographic tree structure, candidate extensions of the node P are first determined. Then, the support of each of the candidate extensions is counted to determine frequent extension itemsets of that node P, while those itemsets not meeting a predetermined support criteria are eliminated. Child nodes corresponding to the frequent extensions and meeting the predetermined support criteria are created. For each frequent child of node P, all itemset associations for all descendants of node P are generated first. Thus, the lexicographic tree structure is generated in a depth first manner. By projecting transactions upon the lexicographic tree structure in a depth-first manner, the CPU time for counting large itemsets is substantially reduced.

32 Claims, 9 Drawing Sheets

Algorithm AggregateCounts(Input: $2^{|E(P)|}$ buckets with transaction counts)
begin
  {We assume that there are $2^{|E(P)|}$ buckets, one
    corresponding to each bitstring of length $|E(P)|$}
  $k=|E(P)|$
  for $i := 1$ to k do
    begin
    for $j := 1$ to $2^k$ do
    if the $i$th bit of bitstring representation of $j$ is 0 then
      begin
      $bucket[j] = bucket[j] + bucket[j + 2^{i-1}]$
      end
    end
end

*Fig. 8*

| Bit Pattern | Count |
|---|---|
| 000 | 2 |
| 001 | 3 |
| 010 | 4 |
| 011 | 1 |
| 100 | 5 |
| 101 | 4 |
| 110 | 6 |
| 111 | 2 |

Iteration 1 →

| | |
|---|---|
| 00* | 2+3 |
| 001 | 3 |
| 01* | 4+1 |
| 011 | 1 |
| 10* | 5+4 |
| 101 | 4 |
| 11* | 6+2 |
| 111 | 2 |

Iteration 2 ↓

| | |
|---|---|
| 0** | 5+5 |
| 0*1 | 3+1 |
| 01* | 5 |
| 011 | 1 |
| 1** | 9+8 |
| 1*1 | 4+2 |
| 11* | 8+2 |
| 111 | 2 |

← Iteration 3

| | |
|---|---|
| *** | 10+17 |
| **1 | 4+6 |
| *1* | 5+8 |
| *11 | 1+2 |
| 1** | 17 |
| 1*1 | 6 |
| 11* | 8 |
| 111 | 2 |

Fig. 9

DEPTH FIRST METHOD FOR GENERATING ITEMSETS

BACKGROUND OF THE INVENTION

1. Field of the Invention

The present invention relates generally to the field of data mining, and more particularly, a novel data mining system and depth first search methodology for generating associations among items in a large database.

2. Discussion of the Prior Art

The problem of finding association rules was introduced in a reference entitled "Mining Association Rules Between Sets of Items in Very Large Databases," Proceedings of the ACM SIGMOD Conference on Management of Data, pages 207–216, 1993 authored by Agrawal R., Imielinski T., and Swami A. The problem identified in the reference was directed to finding the relationships between different items in a large database, e.g., a database containing customer transactions. Such information can be used for many sales purposes such as target marketing, because the buying patterns of consumers can be inferred from one another.

As described in the above-mentioned reference, there is first identified a set $\{I\}$ comprising all items in the database of transactions. A transaction $\{T\}$ which is a subset of $\{I\}$ is defined to be a set of items which are bought together in one operation. An association rule between a set of items $\{X\}$ which is a subset of $\{I\}$ and another set $\{Y\}$ which is also a subset of $\{I\}$ is expressed as $\{X\} \rightarrow \{Y\}$, and indicates that the presence of the items X in the transaction also indicates a strong possibility of the presence of the set of items Y. The measures used to indicate the strength of an association rule are support and confidence. The support of the rule $X \rightarrow Y$ is the fraction of the transactions containing both X and Y. The confidence of the rule $X \rightarrow Y$ is the fraction of the transactions containing X which also contain Y. In the association rule problem, it is desired to find all rules above a minimum level of support and confidence. The primary concept behind most association rule algorithms is a two phase procedure: In the first phase, all frequent itemsets (or large itemsets) are found. An itemset is "frequent" or large if it satisfies a user-defined minimum support requirement. The second phase uses these frequent itemsets in order to generate all the rules which satisfy the user specified minimum confidence.

Since its initial formulation, considerable research effort has been devoted to the association rule problem. A number of algorithms for large itemset generation have been proposed, such as those found in Agrawal R., Mannila H., Srikant R., Toivonen H., and Verkamo A. I. "Fast Discovery of Association Rules." Advances in Knowledge Discovery and Data Mining, AAAI/MIT Press, Chapter 12, pages 307–328. Proceedings of the 20th International Conference on Very Large Data Bases, pages 478–499, 1994. and Brin S., Motwani R. Ullman J. D. and Tsur S., "Dynamic Itemset Counting and Implication Rules for Market Basket Data." Proceedings of the ACM SIGMOD, 1997. pages 255–264. Variations of association rules such as generalized association rules, quantitative association rules and multilevel association rules have been studied in Srikant R., and Agrawal R., "Mining Generalized Association Rules." Proceedings of the 21st International Conference on Very Large Data Bases, 1995, pages 407–419, and, Srikant R., and Agrawal R. "Mining Quantitative Association Rules in Large Relational Tables," Proceedings of the ACM SIGMOD Conference on Management of Data, 1996, pages 1–12.

Although there are many previously proposed methods and systems, there is no efficient method which can generate large itemsets for very large scale problems. For these problems, current techniques require too much time to be of any practical use. The importance of solving such large scale problems is quite great, given the fact that most databases containing customer transaction data are quite large.

SUMMARY OF THE INVENTION

The present invention is directed to a computer-implemented system and method for mining long patterns in databases, which relies on a depth-first search technique in order to construct a lexicographic tree of itemsets. The depth first traversal of a tree is defined to be the process of traversing the nodes in the tree in such a way that after examining a node, all of that nodes descendants are examined before examining any other node. In depth-first strategy, the nodes of the lexicographic tree are examined in depth-first order in order to count the supports of their candidate extensions. In other words, all descendant itemsets of a node are examined before examining other nodes of the lexicographic tree. By projecting transactions upon the lexicographic tree structure in a depth-first manner, the CPU time for counting large itemsets is substantially reduced.

Novel and innovative counting methods are implemented including byte-wise counting and postprocessing for higher level nodes in the lexicographic tree structure; and, a two phase bucketing procedure, for counting support at lower level nodes. Use of these counting methods efficiently optimizes processing time and database storage utilization.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
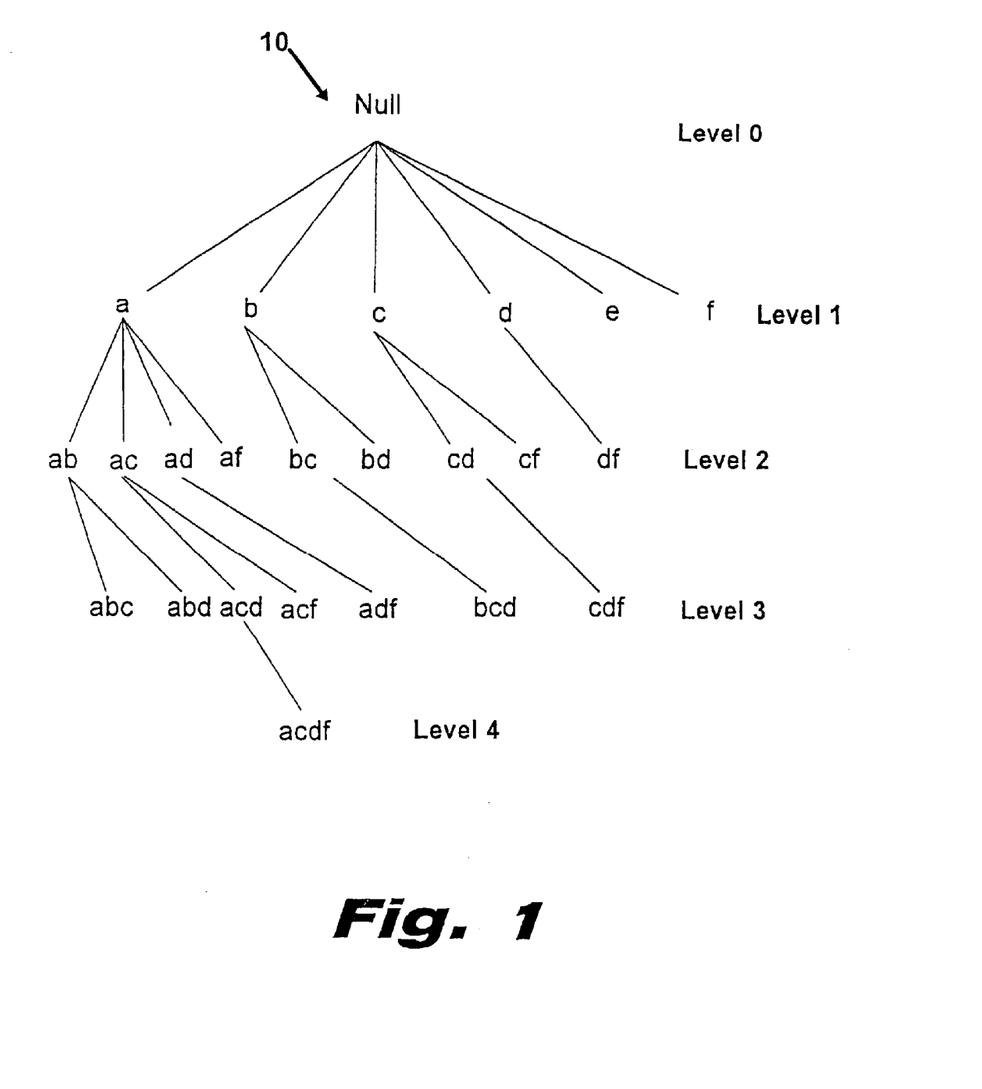
FIG. 1 depicts a lexicographic tree which is an example of a graph structure used in order to count the itemsets according to the method of the invention.

FIG. 1 is an example of the lexicographic tree structure 10 representing items in a large database defined as existing in a lexicographic ordering. As described in greater detail in commonly-owned, co-pending U.S. patent application Ser.

No. 09/183,410 entitled SYSTEM AND METHOD OF GENERATING ASSOCIATIONS. As shown in FIG. 1, the tree 10 includes: (1) A vertex corresponding to each large itemset with the root of the tree corresponding to the null itemset; and, (2) nodes I={i1. . . . ,ik} representing a large itemset, where i1, i2 . . . ,ik are listed in a lexicographic order. The parent of the node I is the itemset {i1, . . . i(k−1)}. Since the nodes in the lexicographic tree have a one-to-one correspondence with itemsets, the term node and itemset will be interchangeably referred to in this invention. Various levels are indicated in the lexicographic tree of FIG. 1 that correspond to the sizes of the corresponding itemsets. Thus, for the example lexicographic tree 10 in FIG. 1, levels 0–4 are indicated, with level 0 being the empty or "null" node.

Additionally defined is a "frequent lexicographic tree extension" or, "tree extension" of an itemset which comprises those items that contribute to the extension and forming an edge in the lexicographic tree 10. In the example illustrated in FIG. 1, the frequent lexicographic extensions of node a are b, c, d, and f. For purposes of discussion, the set of frequent lexicographic tree extensions of a node P is denoted as E(P). Additionally defined is the immediate ancestor Q of the itemset P in the lexicographic tree.

The set of "candidate branches" of a node P is defined to be those items in E(Q) which occur lexicographically after the node P. These are the possible frequent lexicographic extensions of P in a set denoted as R(P). Thus, in view of FIG. 1, the following relationships are defined: E(P) is a subset of R(P), which is a subset of E(Q). The value of E(P) in FIG. 1, when P=ab is {c,d}. The value of R(P) for P=ab is {c, d, f}, and for P=af, R(P) is empty.

For purposes of discussion, a node P is said to be "generated" when for the first time its existence is discovered by virtue of an extension of its immediate parent. A node is further said to have been "examined" when its frequent lexicographic tree extensions have been determined. Thus, the process of examination of a node P results in generation of further nodes, unless the set E(P) for that node is empty. Thus, a node can be examined only after it has been generated.

Furthermore, an itemset is defined to be a FREQUENT MAXIMAL ITEMSET, if it is frequent, and no superset of it is frequent. Thus, in FIG. 1, the itemset acdf is maximal. An itemset is defined to be lexico-maximal, if the corresponding node is a leaf in the lexicographic tree. Clearly, all maximal nodes are lexico-maximal, but not vice-versa. For example, the node acf is lexico-maximal, but not maximal.

Let P be a node in the lexicographic tree corresponding to a frequent k-itemset. Then, for a transaction T, a projected transaction T(P) is defined as being equal to (T (intersection) E(P)) where "intersection" refers to the set intersection operation. For a set or block of transactions "Tau," the projected transaction set Tau(P) is defined as the set of projected transactions in Tau with respect to its frequent extensions E(P) at P. For example, consider a transaction abcdefghk applied to the illustrative lexicographic tree 10 of FIG. 1, the projected transaction at node "null" would be {a, b, c, d, e, f, g, h, k} (intersection) {a, b, c, d, f}=abcdf. The projected transaction at node a would be bcdf. For the transaction abdefg, its projection on node ac is null because it does not contain the required itemset ac.

In the description of the invention as follows, the following points are emphasized: (1) For a given transaction T, the information required to count the support of any itemset which is a descendant of a node P is completely contained in T(P); (2) The number of items in a projected transaction T(P) is typically much smaller than the original transaction; and, (3) For a given transaction set Tau and node P the ratio of the number of transactions in Tau(P) and Tau is approximately determined by the support of P.

The present invention is a methodology that enables the construction of a lexicographic tree in depth-first order by starting at the null node (FIG. 1) and successively generating nodes until all nodes have been generated and subsequently examined.

The depth first traversal of a tree is defined to be the process of traversing the nodes in the tree in such a way that after examining a node, all of that nodes descendants are examined before examining any other node. In depth-first strategy, the nodes of the lexicographic tree are examined in depth-first order in order to count the supports of their candidate extensions. In other words, all descendant itemsets of a node are examined before examining other nodes of the lexicographic tree. Among a given set of children of a particular node, the lexicographically least item is always extended first. Thus, the order in which a depth-first search method would examine the nodes in FIG. 1 is null, a, ab, abc, abd, ac, acd, acdf, acf, ad, adf, af, b, bc, bcd, bd, c, cd, cdf, cf, d, df, e, and f. At any point in the search, the projected transaction sets for some of the nodes are maintained on the path from the root to the node which is currently being extended. A pointer is maintained at each node P to the projected transaction set which is available at the nearest ancestor of P. Since the projected database is substantially smaller than the original database both in terms of the number of transactions, and the number of items per transaction, the process of finding the support counts is sped up substantially.

The following information is stored at each node during the process of construction of the lexicographic tree: (1) The itemset P at that node; (2) The set of lexicographic tree extensions at that node which are E(P); (3) A pointer to the projected transaction set Tau(Q), where Q is an ancestor of P (including itself). This transaction set Tau(Q) is used in order to perform the counting at node P. The root of the tree points to the entire transaction database; and, (4) A bitvector containing the information about which transactions contain the itemset corresponding to node P as a subset. The length of this bitvector is equal to the total number of transactions in Tau(Q). The value of a bit for a transaction is equal to 1, if the itemset P is a subset of the transaction. Otherwise it is equal to zero. Thus, the number of 1-bits in this set is equal to the number of transactions which project to the node P. The bitvectors are used in order to make the process of support counting at a node more efficient.

Once all of the projected transactions at a given node are identified, then finding the subtree rooted at that node is a completely independent itemset generation problem with a substantially reduced transaction set. As was mentioned earlier, the number of transactions at a node is proportional to the support at that node. An important fact about projections is the following: by using hierarchical projections, the information from counting k-itemsets is reused in order to count (k+1)-itemsets. Thus, if a transaction T does not contain a k-itemset I as a subset, then the projection strategy ensures that T will not be used in order to count any of the extensions of I. This is important in reducing the running time, since a large fraction of the transactions will not be relevant in counting the support of an itemset.

The methodology for depth-first construction of a lexicographic tree structure representing associated items of a large database that meets minimum support requirements is now described in greater detail.

Figure 2:
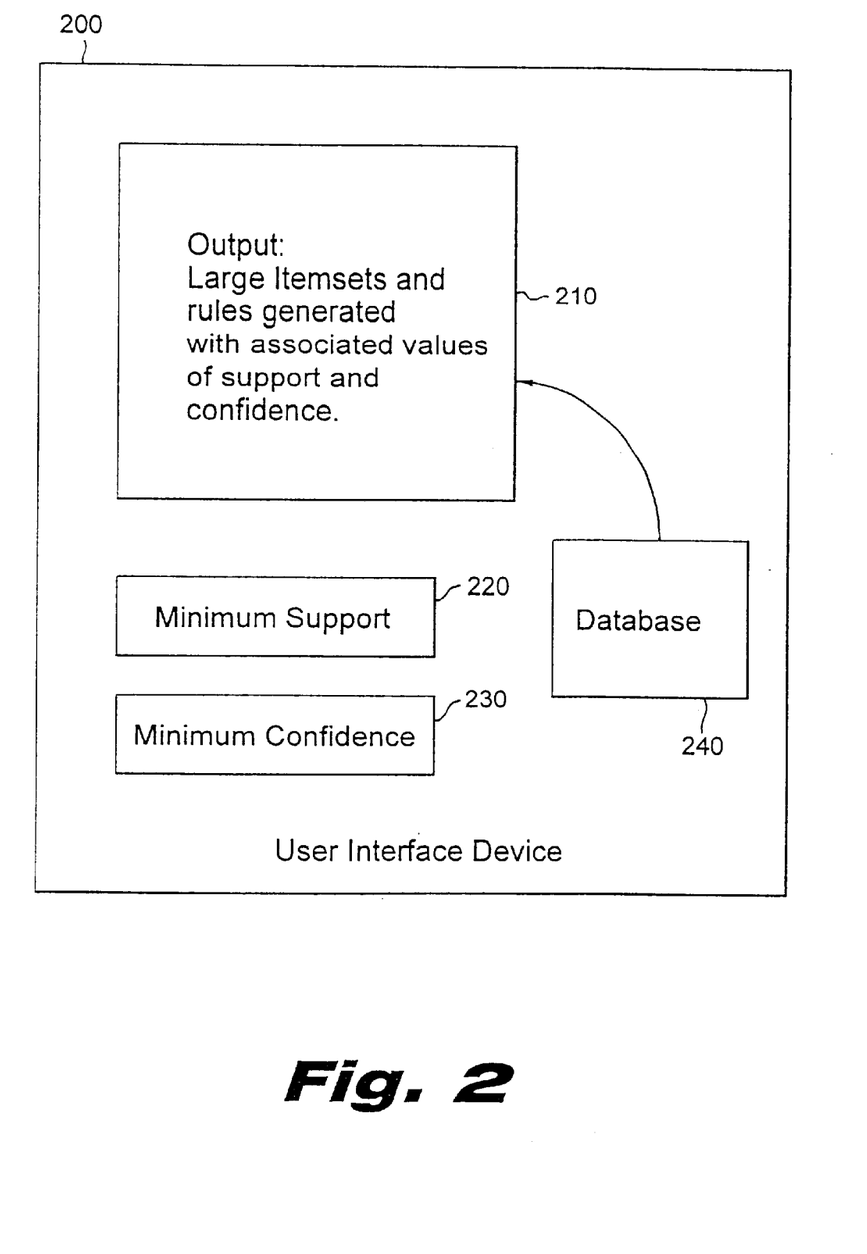
FIG. 2 is a description of the user-interface which is implemented in the present invention.

FIG. 2 illustrates a computing system implementing a CPU and providing a user-interface device having entry fields 220 and 230 enabling users to specify values of minimum support and minimum confidence, respectively. In response to these entries, large itemsets and rules are generated in accordance with the method of the invention for display in screen display area 210. Associated with each large itemset is a minimum support value, while associated with each rule is a minimum confidence value. A database, memory storage system or flat file storage 240 is additionally provided that is populated with records of all commercial transactions, e.g., customer retail purchases collected over a particular time period. Each transaction record includes: a transaction id, and a number of corresponding actual item ids, comprising as SKU codes, for example, pertaining to a customer's transaction or purchase. As will be described, the transactions from this database 240 and subsets thereof, are projected onto the active nodes of the tree 10 in the node examination process.

Figure 3:
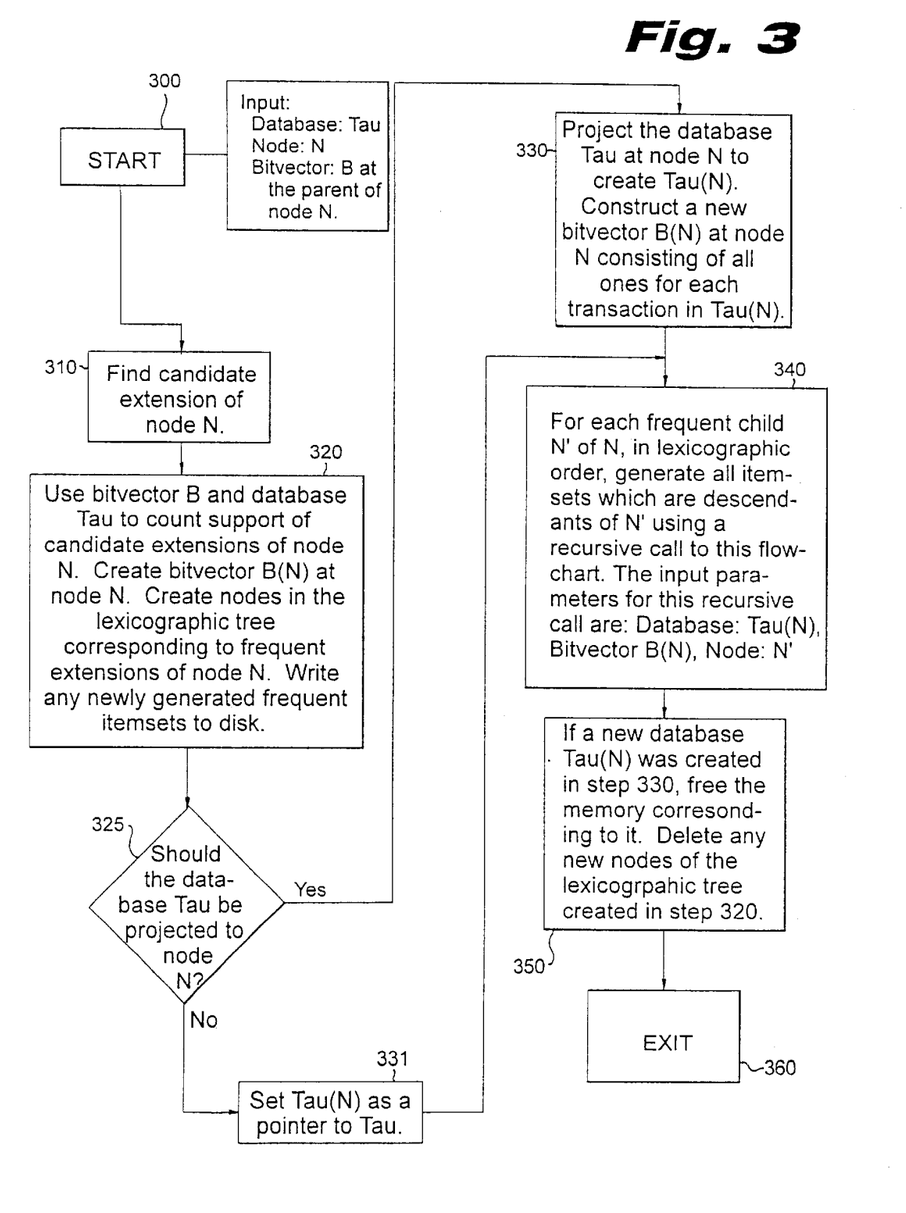
FIG. 3 illustrates the overall process of creating the lexicographic tree according to the invention.

The process of performing depth-first search is illustrated in FIG. 3. As mentioned earlier, the lexicographic tree is created in depth-first order, i.e., starting at the root node of the tree, nodes are successively created at the lower levels of the tree, while examining the leftmost branches first. As will be described in greater detail, the methodology is recursive, in that the process calls itself repeatedly in order to generate the frequent itemsets. Accordingly, in view of the flowchart of FIG. 3, each call to the process has three parameters: a transaction database Tau, node N, and a bitvector B at the parent of node N. In each call, the frequent extensions of node N (if any) are determined, and then recursively perform the process for each child N' of N in lexicographic order. During this process, any frequent itemsets which were generated are tracked. The first call to the flowchart is from the null node, with the entire transaction database, and the bitvector comprising all ones (1's). The candidate branches from the null node is the entire set of items in the tree. The call to the flowchart from the null node is the first call according to the method of the invention.

At step 310 of the depth-first search algorithm of FIG. 3, the candidate extensions of the node N are first determined. When N is null, the candidates are simply the set of all items. For the case of other nodes, the details of the process will be described in greater detail with reference to FIG. 5. Next, at step 320, the bitvector B and database Tau are used in order to count the support of all candidate extensions of node N. Concurrently, the bitvector B(N) for the node N is calculated. The details of how the support counting may be performed and how bitvector B(N) is generated will be described in greater detail with reference to FIG. 6. All those extensions which form frequent extensions of N and meet the minimum specified support criteria are used in order to create new nodes of the lexicographic tree and any newly generated frequent itemsets are written to disk.

According to the preferred embodiment, it is possible to be selective about the nodes at which projected transactions may be maintained. For example, it is possible to use the heuristic rule that a projected transaction set may be maintained at a node only when the size of the projected database is less than a certain factor of the previous database size. Alternatively, it is possible to maintain a projected transaction set at a node, only when the number of bits to represent the (projected) transaction at that node is less than a certain number, i.e. |E(P)| falls below a certain number, where |E(P)| refers to the cardinality of the set E(P). The exact implementation for performing the projections which provides the best performance may vary depending upon the nature of the underlying data. In order to perform the counting at a given node, use is made of the projected transactions which are stored at the nearest ancestor of that node.

Thus, as shown at step 325, a decision is made as to whether database Tau may be projected at node N, with the projection expressed in terms of the frequent extensions of node N, which were determined in step 320. The advantage of projecting the database at node N is that since the size of the database is further reduced, the process of counting any frequent descendants of the node N is sped up substantially. On the other hand, more memory is required in order to hold the projected transactions. A natural technique of handling this is that it is profitable to write projected transactions at a node, when the (projected) database size reduces substantially.

Several criteria may be used in order to determine whether the database Tau should be projected to the node N at step 325. In the preferred embodiment of the invention, the database Tau is projected to node N when the number of frequent extensions at node N is less than about 32. Alternately, if the database is not projected, then Tau(N) is simply a pointer to the original database Tau (no new copies need to be created), as indicated at step 331. When Tau is projected onto node N at step 330, then all projected transactions in Tau(N) trivially project onto node N, and hence the bitvector B(N) at node N is replaced by a new bitvector whose length is equal to the number of transactions in Tau(N), and which consists of all ones. Since, all frequent extensions of node N have been generated, it is possible to call the flowchart recursively for each frequent extension N' of N in order generate all itemsets which are descendants of those nodes. This recursive call is made in made in step 340. The input parameters to the flowchart are: Database Tau(N), Bitvector B(N), and Node N'. Thus, the number of times the flowchart for FIG. 3 would be called recursively by itself is equal to the number of frequent extensions of node N. After all of these recursive calls have been completed (and hence all itemsets rooted at node N have been found and written to disk), the current call for node N by is completed by doing some memory management in step 350. Any new nodes, bitvectors, and projected databases which were created during this call to the algorithm are removed in order to free the memory space. It should be understood that this memory space can then be reused by the other recursive calls to the procedure.

Figure 4:
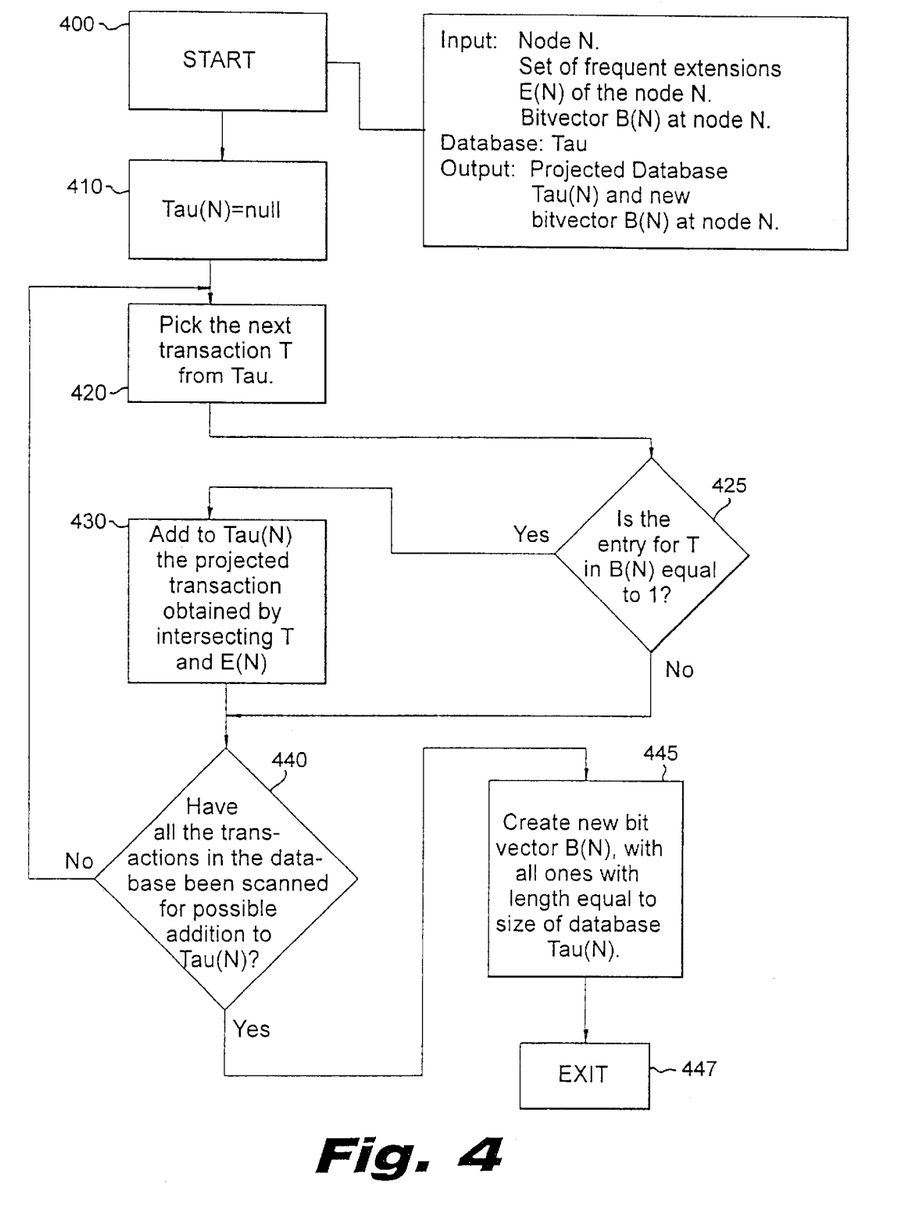
FIG. 4 illustrates the detailed process for projecting the database onto a node according to step 330 of FIG. 3.

The process of projecting a database on to a node as required at step 330, FIG. 3, is now illustrated with respect to FIG. 4. The idea in projections is to reduce the number of transactions at each node, so that a fewer number of transactions are used for the process of counting. At the same time, the number of fields in each transaction is reduced so that the counting can be performed more efficiently. Let Tau represent the database of transactions to be projected at a node. The output of the algorithm is the projected database Tau(N). The set of frequent extensions of the node N is denoted by E(N). As indicated at step 410, FIG. 4, the projected database Tau(N) is set to null. Transactions are projected one at a time and added to this database. At step 420, the next transaction T is picked from the database Tau. In order to decide whether N is a subset of T, a determination is made if the bit for T in the bitvector at N is one (1) as indicated at step 425. If the itemset N is a subset of T, then the projected transaction obtained by the intersection of T and E(N) is added to the database as indicated at step 430. In step 440, a check is made to determine if the entire database has been scanned. If the entire database has not been scanned, then the process repeats by returning to step 420. Otherwise, the new bitvector B(N) is created at step 445, which consists of all ones and has a length equal to the number of transactions in Tau(N) and, the procedure terminates at step 447.

As the methodology of the invention is oriented for generating long patterns, performance of the algorithm is improved by implementing a bitstring representation of transactions in the database. In the bitstring representation each item in the database has one bit representing it. Thus, the length of each transaction in bits is equal to the number of items in the database. Such a representation is inefficient when the number of items in each transaction is significantly less than the total number of items. This is because of the fact that most of the bits take on the value of 0. In such a case, it is more efficient to maintain an explicit list of item ids. However, the depth first methodology described herein performs counting on the projected transactions which are expressed in terms of E(P). Furthermore, for problems in which the database contains long patterns, the ratio of the maximum pattern length to the total number of items is relatively high.

As an example, when selectively determining whether the database is to be projected at a particular node after implementation of the algorithm over several datasets, optimized performance is achieved when the database is projected only when |E(P)| is reduced to less than 32. In this case, projected transactions can be represented as, e.g., 32 bit words. Thus, a projected database with one million transactions may be represented in only 4 MB, when |E(P)| is less than 32. This illustrates the considerable advantages of using the bitstring representation for holding the projected transactions.

Figure 5:
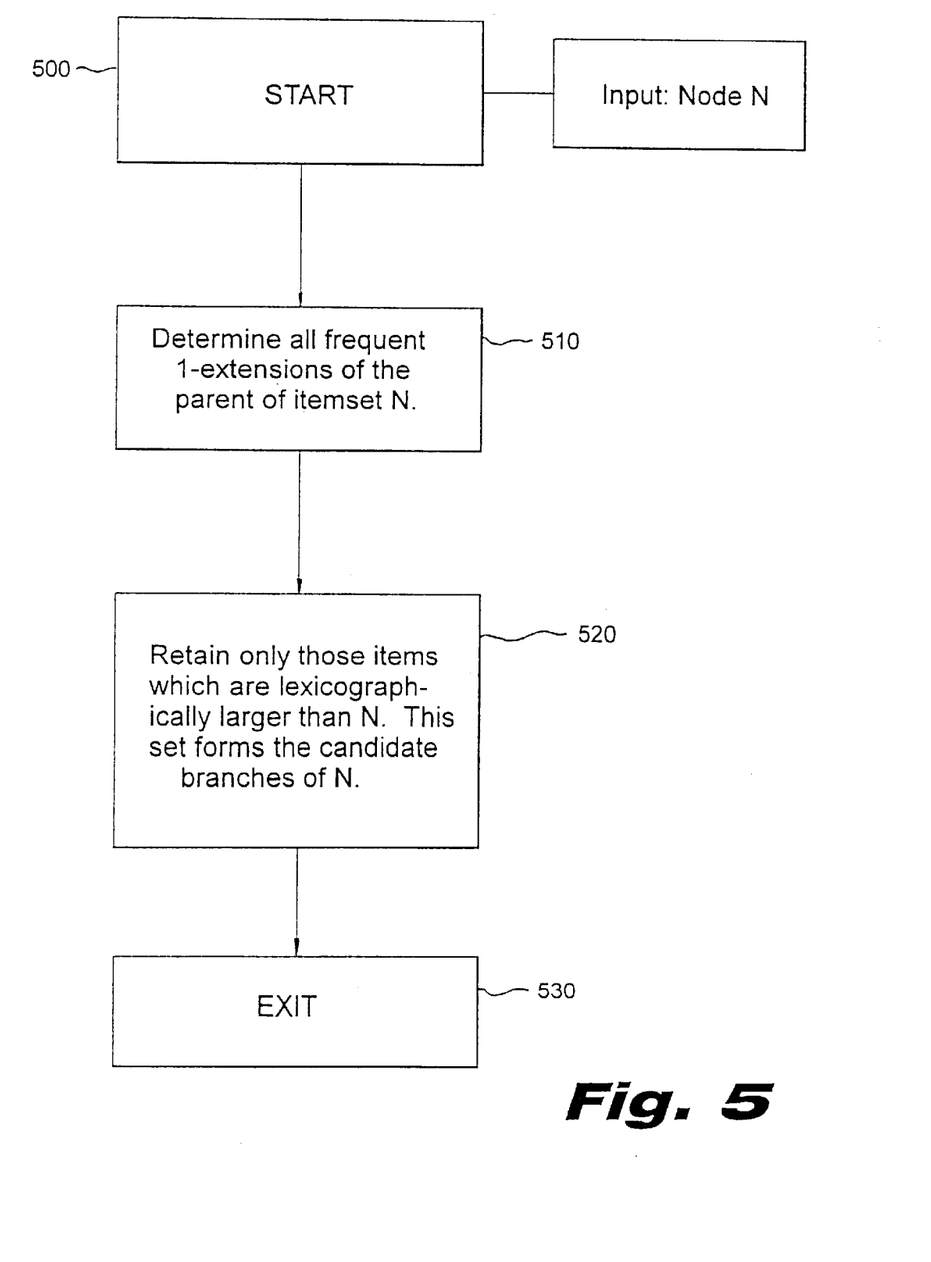
FIG. 5 illustrates the process for determining the candidate children of the CurrentNode.

FIG. 5 illustrates the detailed process of determining the candidate children at a node in the lexicographic tree as illustrated with respect to step 310, FIG. 3. Letting all the frequent 1-extensions of the parent of itemset N be {i1, i2, . . . iK}, when arranged in lexicographic order. Of these 1-extensions, let the ones which are lexicographically larger than the itemset N be denoted by {ir . . . iK}. These 1-extensions form the candidate branches of the node N. In step 510, all the frequent 1-extensions of the parent of node N are determined. It should be noted that these 1-extensions include the extension which leads to the creation of node N). In step 520, only those items which are lexicographically larger than all the items in N are retained. The items corresponding to these extensions are candidate extensions of N. The algorithm terminates at step 530.

Carefully designed counting methods are critical in reducing the times for finding support counts and using the bitstring representation is helpful in reducing the times for finding support counts. Consider a node P at which it is desirable to count the support of each item in F(P), Q is the nearest ancestor of P at which the projected database Tau(Q) is maintained and T is a transaction in Tau(Q). One method of counting is to maintain a counter for each item in F(P) and add one to the counter of each of those elements for which the corresponding bit in T takes on the value of 1. However, it is possible to reduce the counting times greatly by using a two phase bucket counting method.

Figure 6:
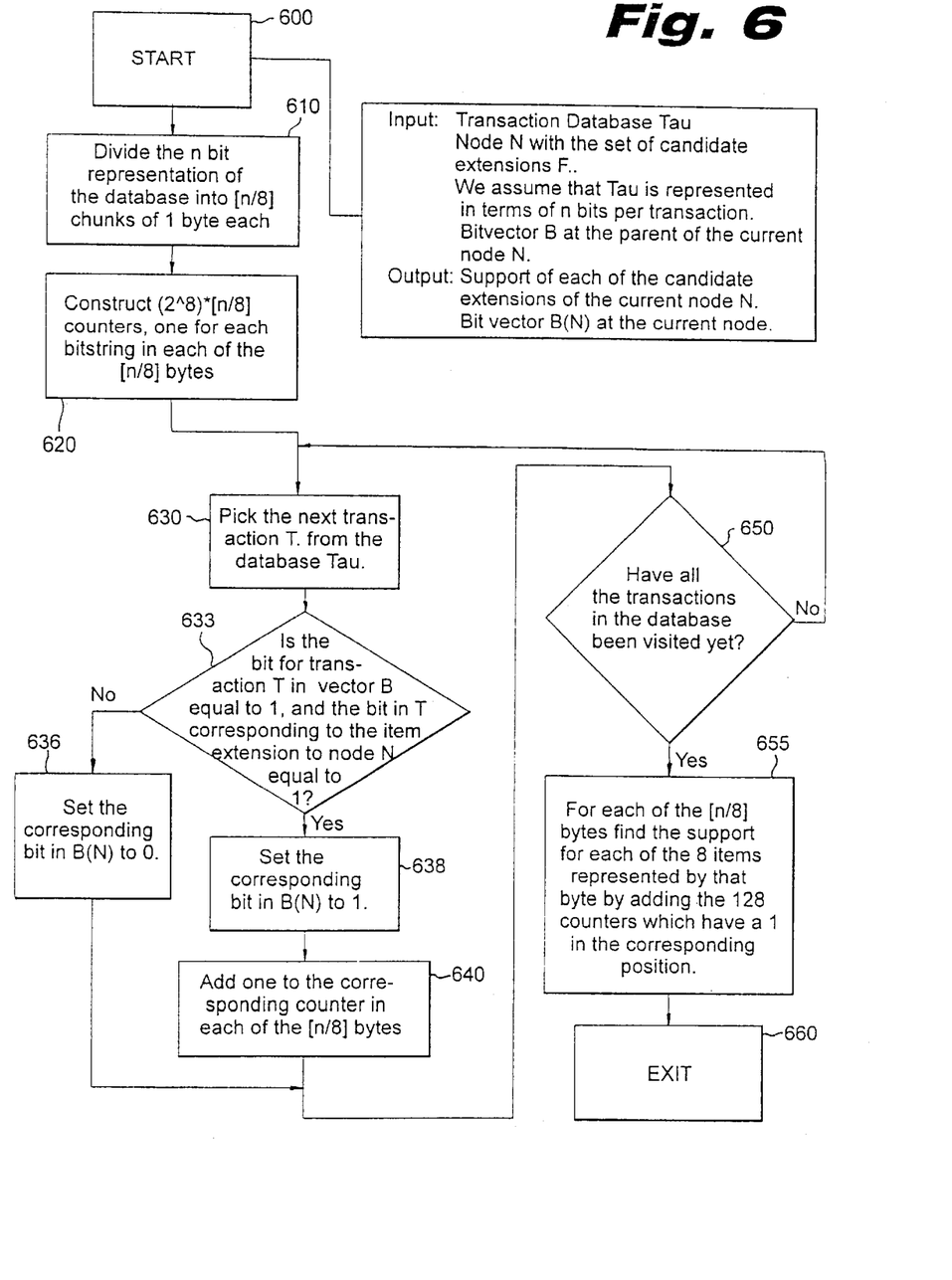
FIG. 6 illustrates the detailed process for creating bitvectors used for counting support in the lexicographic tree according to step 320 of FIG. 3.

FIG. 6 illustrates the detailed process of performing the counting at a node in the lexicographic tree as performed at step 320, FIG. 3. In order to actually perform the counting, a byte counting technique is implemented as follows: Let 'n' be the number of bits in terms of which the transaction database Tau is expressed. It is desired to find the support of each of these n extensions in order to determine which of them have high enough support. The idea in byte counting is to break up the n bits into [n/8] chunks of 1 byte each, as indicated at step 610. In step 620, a set of $2^8$ counters is constructed; one for each of the [n/8] bytes. These $2^8$ counters correspond to the 256 possibilities in a one-byte bitstring. Thus a total of 256*[n/8] counters are required in order to perform the counting. After this process, each projected transaction in the database is visited one by one in an iterative looping process, and the appropriate counters are updated, as indicated at steps 630–650. Step 655 is the postprocessing procedure in which the counters for each of the [n/8] bytes are used in order to find the support of each candidate extension.

A first step in the counting technique is to decide whether the transaction T should be used in counting the support of the candidate extensions of node P, i.e., if T projects to the node P. The bit vector B maintained at the immediate parent of P provides the information as to whether the immediate parent of P is a subset of T. In addition, a check is made to determine whether the item representing the extension to P (lexicographically largest item of P) is contained in T. Particularly, at step 630, the next transaction T is picked from the database Tau and a determination is made as to whether this transaction should be used in order to perform the counting at node N. Thus, at step 633, the bit value for the transaction T in the vector B is checked to determine if it is equal to 1, and whether the lexicographically largest item of N is in T. If not, then the corresponding bit in the new bit vector B(N) at that node is set to 0 (step 636). Otherwise, the corresponding bit in B(N) is set to 1 at step 638, and the counter corresponding to the appropriate counter in each of the [n/8] bytes is incremented (by 1) in step 640. The appropriate bucket for a byte is determined by finding the counter whose bitstring is the same as the bitstring for the corresponding byte in the transaction. Thus, a total of [n/8] counters are updated during this process. In step 650, a determination is made as to whether all the transactions in the database have been used for the purpose of counting. If all the transactions in the database have not been used for counting, then the process returns to step 630 to pick the next transaction. Otherwise, the process proceeds to step 655 in order to perform a postprocessing procedure implementing a function for converting these counts into support values of individual items. The method then terminates at step 660.

In the subsequent postprocessing phase (step 655), the support of an item is determined by adding the counts of the 256/2=128 counters which take on the value of 1 for that bit. Particularly, in order to count the support value of an individual item, those counters which have a 1 in the bit position corresponding to that item are aggregated, as indicated at step 655, FIG. 6. Thus, for each of these candidate extensions of the node, an aggregation operation is performed. Specifically, for the item corresponding to the $i^{th}$ position in the bitstring (i may range between 1 through n), the supports of those counters which have a 1 bit at position i are added to obtain the support of the item corresponding to the position i. Thus, this phase requires 128*n addition operations, and is independent of the database size. The first phase, (which is the bottleneck) is the improvement over the first counting method, since it performs only 1 operation for each byte in the transaction, which contains 8 items. Thus, the counting method of the invention is a factor of eight (8) times faster than the first naive counting technique, as the need to scan the entire bitstring is obviated.

It should be understood that the counting times are determined by the time spent at the lower level nodes, at which the projected transactions are inherently dense. However, at the lower levels of the tree, another specialized technique herein referred to as "bucketing" may be used in order to perform the counting.

As mentioned, most of the nodes in the lexicographic tree correspond to the lower levels. Thus, the counting times at these levels may form the bottleneck operations for the algorithm. For these levels, a "bucketing" strategy is implemented in order to substantially improve the counting times. The idea of bucketing is to change the counting technique at a node in the lexicographic tree, if $|E(P)|$ is less than a certain value, for example. In this case, an upper bound on the number of distinct projected transactions is $2^{|E(P)|}$. Thus, for example, when $|E(P)|$ is 9, then there are only 512 distinct projected transactions at a node P. Clearly, this is because the projected database contains several repetitions of the same (projected) transaction. The fact that the number of distinct transactions in the projected database is small is exploited to yield substantially more efficient counting algorithms. The process of performing bucket counting thus consists of two phases:

(1) In the first phase, a count is performed to determine how many of each distinct transaction are present in the projected database. This can be accomplished easily by maintaining $2^{\{|E(P)|\}}$ buckets or counters, scanning the transactions one by one, and adding counts to the buckets. The time for performing this set of operations is linear in the number of database transactions.

(2) In the second phase, the $2^{\{|E(P)|\}}$ transaction counts are used to determine the aggregate support counts for each itemset. In general, the support count of an itemset may be obtained by adding the counts of all the supersets of that itemset to it. The algorithm for performing these operations is illustrated in FIG. 8, as will hereinafter be further described in greater detail.

Figure 7:
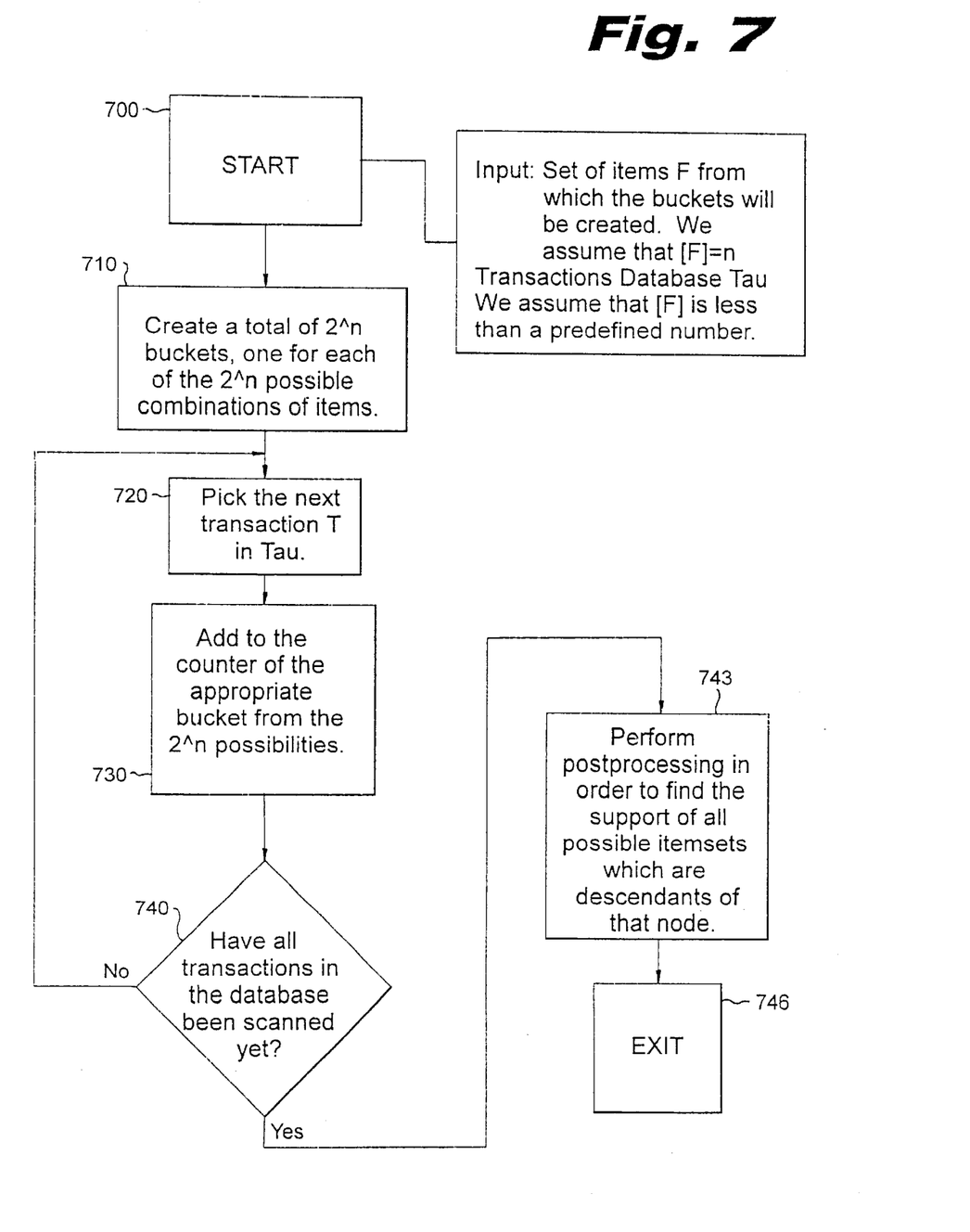
FIG. 7 illustrates the "bucketing" process used for counting at the lower levels of the tree.

The "bucketing" process is now explained in greater detail in view of FIG. 7. As previously mentioned, bucketing is performed at the lower levels of nodes in the tree. At these lower levels, the number of candidate branches at the node is less than a certain predefined number, i.e., the predefined number $|F|=n$ is such that the value of $2^{|F|}$ is "relatively small". A preferred embodiment for picking this predefined number is by choosing n such that $2^n$ is at most equal to the number of transactions which project to that node. Thus, as indicated at step 710, FIG. 7, a total of $2^n$ possible buckets are created which represent all possible combinations of these n items. Each of these buckets will contain the count for the corresponding itemset.

In the first phase, as illustrated at steps 720–740, the counts of all the buckets are ascertained by scanning through the transaction database and adding to the bucket counts. In the second phase, a postprocessing technique is applied to these bucket counts in order to find the final support values. Specifically, in the first phase of the bucketing procedure, the next transaction T in Tau is picked at step 720, and added to the counter of the appropriate bucket from the $2^n$ possibilities in step 730. The appropriate bucket is determined by matching the bitstring corresponding to the bucket with the bitstring corresponding to the projected transaction at that node. In step 740, a check is made to determine if all the transactions in the database have been scanned for the purpose of counting. If all the transactions in the database have not been scanned, then the process returns to step 720. Otherwise, if all the transactions in the database have been scanned, then the postprocessing procedure is commenced in step 743.

Figure 8:
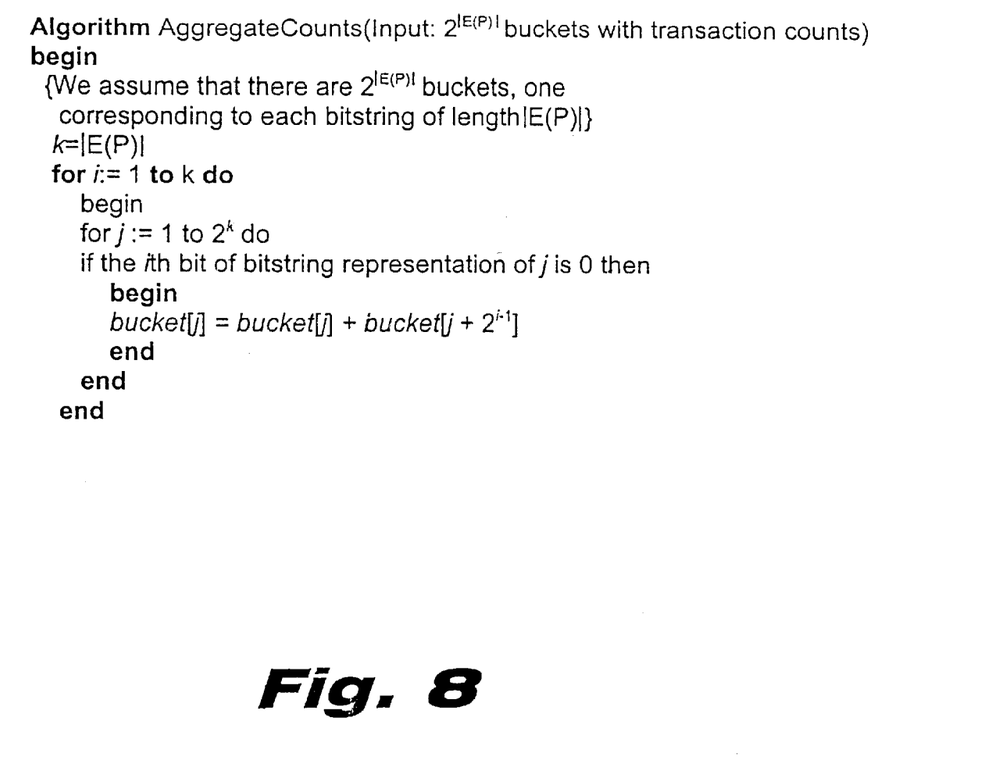
FIG. 8 is an algorithmic description of the bucketing technique.

FIG. 8 illustrates a detailed pseudo-code description of the post-processing procedure. The bucket counting is accomplished by adding the counts of the buckets to one another in a selective way. The addition of the count of bucket$[j+2^{(i-1)}]$ to bucket$[j]$ in the pseudo code description of FIG. 8 accomplishes this. At the end of the process, each of the $2^n$ buckets contain the support for the corresponding itemset. Those buckets whose count exceeds the required minimum support are used to generate the tree rooted at that node.

More particularly, when a string is composed of 0, 1, and *, it refers to an itemset in which the positions with 0 and 1 are fixed to those values (corresponding to presence or absence of items), while a position with a * is a "don't care". Thus, all itemsets can be expressed in terms of 1 and *, since itemsets are traditionally defined with respect to presence of items. Consider for example, the case when $|E(P)|=4$, and there are four items, numbered $\{1, 2, 3, 4\}$. An itemset containing items 2 and 4 is denoted by $\{*1*1\}$. Given the information about $2^4=16$ bitstrings which are composed of 0 and 1 and represent all the possible distinct transactions. The algorithm aggregates the counts in $|E(P)|$ iterations. The count for a string with a "*" in a particular position may be obtained by adding the counts for the strings with a 0 and 1 in those positions. For example, the count for the string $\{*1*1\}$ may be expressed as the sum of the counts of the strings $\{01*1\}$ and $\{11*1\}$.

The procedure in FIG. 8 starts with the counts of the 0–1 strings, and then converts them to strings with 1 and * in $|E(P)|$ iterations. In the $i^{th}$ iteration, it increases the counts of all those buckets with a 0 in the $i^{th}$ order bit is increased, so that the count now corresponds to a case when that bucket contains a "*" in that position. This is achieved by adding the counts of the buckets with a '0' in the $i^{th}$ order position to that of the bucket with a 1 in that position, with all other bits having the same value. For example, the count of the string $\{0*1*\}$ is obtained by adding the counts of the buckets $\{001*\}$ and $\{011*\}$. In FIG. 8, the process of adding the count of the bucket [j] to that of the bucket $[j+2^{\{i-1\}}]$ achieves this.

Figure 9:
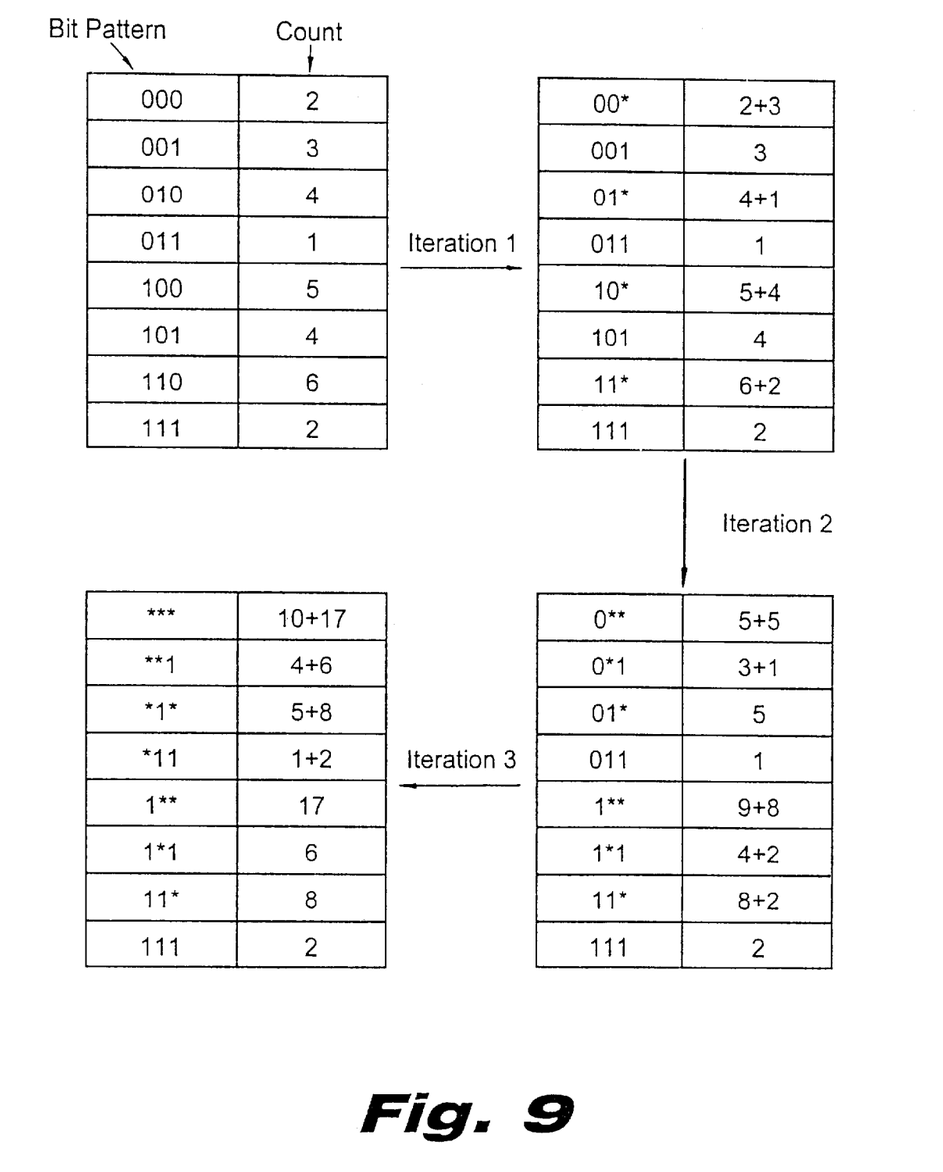
FIG. 9 is an illustration of the application of the bucketing technique to a specific example.

An example of the second phase of bucketing in which $|E(P)|=3$ is now described in view of FIG. 9. The exact strings, i.e., bit patterns, and their corresponding counts in each of the $|E(P)|=3$ iterations are illustrated. In the first iteration, all those bitstrings with 1 in the lowest order position have their counts added to the count of the unique bitstring which has a zero in the corresponding position, with all other bits identical. Thus, $2^{(|E(P)|-1)}$ pairwise addition operations take place during this step. As an example, for the first iteration, the count of bit pattern $\{001\}$ is added to the count of bit pattern $\{000\}$, the count of bit pattern $\{011\}$ is added to the count of bit pattern $\{010\}$, etc. The same process is repeated two more times with the second and third order bits. As an example, for the second iteration, the count of bit pattern $\{01*\}$ is added to the count of bit pattern $\{00*\}$, the count of bit pattern $\{011\}$ is added to the count of bit pattern $\{001\}$, etc. For the third iteration, the count of bit pattern $\{1\}$ is added to the count of bit pattern $\{0\}$, the count of bit pattern $\{1*1\}$ is added to the count of bit pattern $\{0*1\}$, etc. At the end of the three passes, each bucket contains the support count for the appropriate itemset, where the '0' from the bit string is replaced by a "don't care" (*). Note that in this example, the total number of transactions is 27 (count total) and is represented by the string $\{***\}$. Only two transactions contain all the three items, and this is represented by the string $\{111\}$.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. Method for generating itemset associations in a memory storage system comprising a plurality of transactions, with each transaction including one or more items capable of forming said itemset associations, said method comprising:
   a) generating at least one node of a lexicographic tree structure having nodes representing itemset associations meeting a minimum support criteria;
   b) for a lexicographic least itemset of said lexicographic tree structure, determining candidate extensions of a node P;
   c) counting support of said candidate extensions to determine frequent extension itemsets of said node P, eliminating those itemsets not meeting a predetermined support criteria, and creating child nodes corresponding to said frequent extensions meeting said predetermined support criteria;
   d) for each frequent child of node P, generating all itemsets associations for all descendants of node P, to thereby generate said lexicographic tree structure in depth first manner.

2. The method as claimed in claim 1, wherein said step of generating all itemsets for all descendants of node P includes recursively performing steps a)–c), with each recursion starting at a next lexicographic least item of said tree structure.

3. The method as claimed in claim 1, wherein said step c) of counting support of said candidate extensions includes generating bit vector structure at a node for tracking those transactions in said memory storage system that include an itemset corresponding to node P as a subset.

4. The method as claimed in claim 3, wherein said generated bitvector at each node further indicates whether the corresponding transactions project to that node, said bit vector having one bit corresponding to each transaction in a current projection of transactions, the bit having either a first bit value when a transaction projects to the node P, and a second bit value when said transaction does not project to a node P.

5. The method as claimed in claim 3, wherein prior to step d) of generating all itemsets for a frequent child of a node, the step of determining whether each said plurality of transactions in said memory storage system is to be projected at node P to compact a number of relevant transactions and reduce processing time.

6. The method as claimed in claim 5, wherein when it is determined to project said plurality of transactions to said node, the further step of generating new bit vector representation of transactions that may be projected to a frequent child of said node P.

7. The method as claimed in claim 6, further including step of utilizing projected transactions and bitvectors to count the support at a node P or any of its subsequent extensions.

8. The method as claimed in claim 3, wherein said step of determining candidate extensions includes determining frequent 1-extensions of said node P, and retaining those frequent 1-extensions lexicographically larger than node P.

9. The method as claimed in claim 3, wherein said memory storage is organized as a plurality of bitstrings each bitstring having bit corresponding to an item in a transaction.

10. The method as claimed in claim 9, wherein said counting support step b) includes step of counting on a byte-wise basis.

11. The method as claimed in claim 10, wherein said byte-wise counting includes steps of:
   e) grouping said bitstring representation of said transaction into 1-byte segments;
   f) constructing $2^8$ counters, one for each bitstring in each of said 1-byte segments, an n-bitstring representation of each transaction defining n/8 1-byte segments;
   g) determining from said bitvector representation at a node P whether said transaction projects onto said child node and, for each projection that projects, adding one to the corresponding counter in each of n/8 bytes;
   h) performing post processing procedure to find support for each of the items represented by that byte.

12. The method as claimed in claim 9, wherein said step of determining whether said transaction projects onto said node N, includes determining a bitvector at the parent of node N and the bit in a transaction projecting onto said node when an item representing node N extension is included in the transaction, and the corresponding bit value in said bit vector at said parent of node N is of said first value.

13. The method as claimed in claim 12, wherein for each bit position in said transaction, the step of determining the counts of each tree extension by adding the counts of $2^8$ counters for each 1-byte segment which have a 1 in a particular position.

14. The method as claimed in claim 9, wherein when said set of candidate extensions is less than pre-defined number n, said counting support step b) includes a step of implementing bucket counting at a node to determine all of the frequent itemsets which are descendants of a given node.

15. The method as claimed in claim 14, wherein said bucket counting step comprises steps of:
   a) constructing $2^n$ counters, one for each $2^n$ possible combinations of items;
   b) for each transaction in memory storage, adding to each counter of the appropriate bucket from said $2^n$ possible combinations; and
   c) performing post processing procedure to find support for all itemsets which are descendants of that node.

16. The method as claimed in claim 15, wherein said adding step b) includes the step of matching a bitstring corresponding to the bucket with the bitstring corresponding to the projected transaction at that node.

17. A program storage device readable by a machine, tangibly embodying a program of instructions executable by the machine to perform method steps for automatically generating associations of items in a system of transactions wherein each transaction includes one or more items capable of forming said associations, said method steps comprising:
   a) generating at least one node of a lexicographic tree structure having nodes representing itemset associations meeting a minimum support criteria;
   b) for a lexicographic least itemset of said lexicographic tree structure, determining candidate extensions of a node P;
   c) counting support of said candidate extensions to determine frequent extension itemsets of said node P, eliminating those itemsets not meeting a predetermined support criteria, and creating child nodes corresponding to said frequent extensions meeting said predetermined support criteria;
   d) for each frequent child of node P, generating all itemsets associations for all descendants of node P, to thereby generate said lexicographic tree structure in depth first manner.

18. The program storage device readable by a machine as claimed in claim 17, wherein said step of generating all itemsets for all descendants of node P includes recursively performing steps a)–c), with each recursion starting at a next lexicographic least item of said tree structure.

19. The program storage device readable by a machine as claimed in claim 17, wherein said step c) of counting support of said candidate extensions includes generating bit vector structure at a node for tracking those transactions in said memory storage system that include an itemset corresponding to node P as a subset.

20. The program storage device readable by a machine as claimed in claim 19, wherein said generated bitvector at each node further indicates whether the corresponding transactions project to that node, said bit vector having one bit corresponding to each transaction in a current projection of transactions, the bit having either a first bit value when a transaction projects to the node P, and a second bit value when said transaction does not project to a node P.

21. The program storage device readable by a machine as claimed in claim 19, wherein prior to step d) of generating all itemsets for a frequent child of a node, the step of determining whether each said plurality of transactions in said memory storage system is to be projected at node P to compact a number of relevant transactions and reduce processing time.

22. The program storage device readable by a machine as claimed in claim 21, wherein when it is determined to project said plurality of transactions to said node, the further step of generating new bit vector representation of transactions that may be projected to a frequent child of said node P.

23. The program storage device readable by a machine as claimed in claim 22, further including step of utilizing projected transactions and bitvectors to count the support at a node P or any of its subsequent extensions.

24. The program storage device readable by a machine as claimed in claim 19, wherein said step of determining candidate extensions includes determining frequent 1-extensions of said node P, and retaining those frequent 1-extensions lexicographically larger than node P.

25. The program storage device readable by a machine as claimed in claim 19, wherein said memory storage is organized as a plurality of bitstrings each bitstring having bit corresponding to an item in a transaction.

26. The program storage device readable by a machine as claimed in claim 25, wherein said counting support step b) includes step of counting on a byte-wise basis.

27. The program storage device readable by a machine as claimed in claim 26, wherein said byte-wise counting includes steps of:

e) grouping said bitstring representation of said transaction into 1-byte segments;

f) constructing $2^8$ counters, one for each bitstring in each of said 1-byte segments, an n-bitstring representation of each transaction defining n/8 1-byte segments;

g) determining from said bitvector representation at a node P whether said transaction projects onto said child node and, for each projection that projects, adding one to the corresponding counter in each of n/8 bytes;

h) performing post processing procedure to find support for each of the items represented by that byte.

28. The program storage device readable by a machine as claimed in claim 25, wherein said step of determining whether said transaction projects onto said node N, includes determining a bitvector at the parent of node N and the bit in a transaction projecting onto said node when an item representing node N extension is included in the transaction, and the corresponding bit value in said bit vector at said parent of node N is of said first value.

29. The program storage device readable by a machine as claimed in claim 28, wherein for each bit position in said transaction, the step of determining the counts of each tree extension by adding the counts of $2^8$ counters for each 1-byte segment which have a 1 in a particular position.

30. The program storage device readable by a machine as claimed in claim 25, wherein when said set of candidate extensions is less than pre-defined number n, said counting support step b) includes a step of implementing bucket counting at a node to determine all of the frequent itemsets which are descendants of a given node.

31. The program storage device readable by a machine as claimed in claim 30, wherein said bucket counting step comprises steps of:

a) constructing $2^n$ counters, one for each $2^n$ possible combinations of items;

b) for each transaction in memory storage, adding to each counter of the appropriate bucket from said $2^n$ possible combinations; and c) performing post processing procedure to find support for all itemsets which are descendants of that node.

32. The program storage device readable by a machine as claimed in claim 31, wherein said adding step b) includes the step of matching a bitstring corresponding to the bucket with the bitstring corresponding to the projected transaction at that node.

\* \* \* \* \*